(12) United States Patent
Ranum

(10) Patent No.: US 10,801,581 B2
(45) Date of Patent: Oct. 13, 2020

(54) CORD COUPLING SYSTEM

(71) Applicant: Frank Flynt Ranum, Marietta, GA (US)

(72) Inventor: Frank Flynt Ranum, Marietta, GA (US)

( * ) Notice: Subject to any disclaimer, the term of this patent is extended or adjusted under 35 U.S.C. 154(b) by 0 days.

(21) Appl. No.: 16/524,630

(22) Filed: Jul. 29, 2019

(65) Prior Publication Data

US 2020/0040966 A1 Feb. 6, 2020

Related U.S. Application Data

(60) Provisional application No. 62/713,090, filed on Aug. 1, 2018.

(51) Int. Cl.
*F16G 11/14* (2006.01)
*F16G 11/10* (2006.01)

(52) U.S. Cl.
CPC ............ *F16G 11/14* (2013.01); *F16G 11/106* (2013.01)

(58) Field of Classification Search
CPC ............. Y10T 24/3951; Y10T 24/3947; Y10T 24/3944; Y10T 24/3936; Y10T 24/394; F16G 11/14; F16G 11/106
See application file for complete search history.

(56) References Cited

U.S. PATENT DOCUMENTS

| | | | | |
|---|---|---|---|---|
| 206,169 | A | * 7/1878 | Fayman | F16G 11/10 24/134 R |
| 349,031 | A | * 9/1886 | Cook | F16G 11/10 24/134 P |
| 593,256 | A | * 11/1897 | Velie | F16G 11/10 24/134 R |
| 2,315,196 | A | * 3/1943 | Gallione | B65D 19/44 248/499 |
| 5,070,805 | A | 12/1991 | Plante | |
| 5,401,011 | A | * 3/1995 | Gatenby | B25B 13/52 269/131 |
| 7,076,844 | B2 | 7/2006 | Skyba | |
| 7,346,962 | B2 | 3/2008 | van Gijsel et al. | |
| 7,337,504 | B1 | 5/2008 | Casey | |

* cited by examiner

*Primary Examiner* — Robert Sandy
(74) *Attorney, Agent, or Firm* — Eversheds Sutherland (US) LLP

(57) ABSTRACT

A cord coupling system is provided. The cord coupling system includes a housing with a first half, a second half, a top surface, an opposed bottom surface, a front surface, and a rear surface. The housing includes a set of channels. The set of channels have a pair of rotatable jaws partially disposed therein and a pair of gates are adjacent to the pair of rotatable jaws. The pair of rotatable jaws and the pair of gates rotate between a first position and a second position.

20 Claims, 13 Drawing Sheets

CORD COUPLING SYSTEM

RELATED APPLICATIONS

This application claims priority under 35 U.S.C. § 119 to U.S. Provisional Patent Application 62/713,090 filed Aug. 1, 2018, the entire contents of which are hereby incorporated herein by reference for all purposes.

TECHNICAL FIELD

The present disclosure relates generally to a fastening device. More particularly, the present disclosure relates to a coupling system for cords.

BACKGROUND

Ropes, cords, and straps, herein referred to collectively as "cords," are extremely useful tools necessary for accomplishing a variety of purposes. Cords are used for sporting, boating, moving, and many other purposes. Each purpose may require a different type of cord that provides different inherent characteristics. For example, synthetic cords can be useful to repel water and energy absorption, while traditional manila cords can be aesthetically pleasing and be snap-resistant. Moreover, the type of braiding or twisting can also affect the cord's purpose. A braided cord can typically handle higher loads whereas twisted cord can be easy to manufacture but less resistant to wear.

One drawback of cords is that they typically have a fixed length. Therefore, if you need to use a cord over a distance that is greater than the length of the cord or the particular use requires a length that is greater than the length of the cord, multiple cords will be needed and a way to bind the cords will also be needed. Conventional techniques for binding a cord include knot tying. While there are several forms of knots used to bind cords together, each requires individual learning to tie the knot properly. Furthermore, while the use of knots to bind cords can be useful, it typically takes a substantial amount of time to untie the knot when the cords no longer need to be bound. Therefore, tying cords together may not always be the best solution for binding cords.

BRIEF DESCRIPTION OF THE DRAWINGS

The detailed description of example embodiments is set forth with reference to the accompanying drawings. Various embodiments may utilize elements and/or components other than those illustrated in the drawings, and some elements and/or components shown in the drawings may not be present in various embodiments. Elements and/or components in the figures are not necessarily drawn to scale. Throughout this disclosure, depending on the context, singular and plural terminology may be used interchangeably.

DETAILED DESCRIPTION OF THE EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like, but not necessarily the same or identical, elements throughout.

Certain dimensions and features of the cord coupling system are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or positions indicates that the equal relationship between the dimensions or positions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Figure 1A:
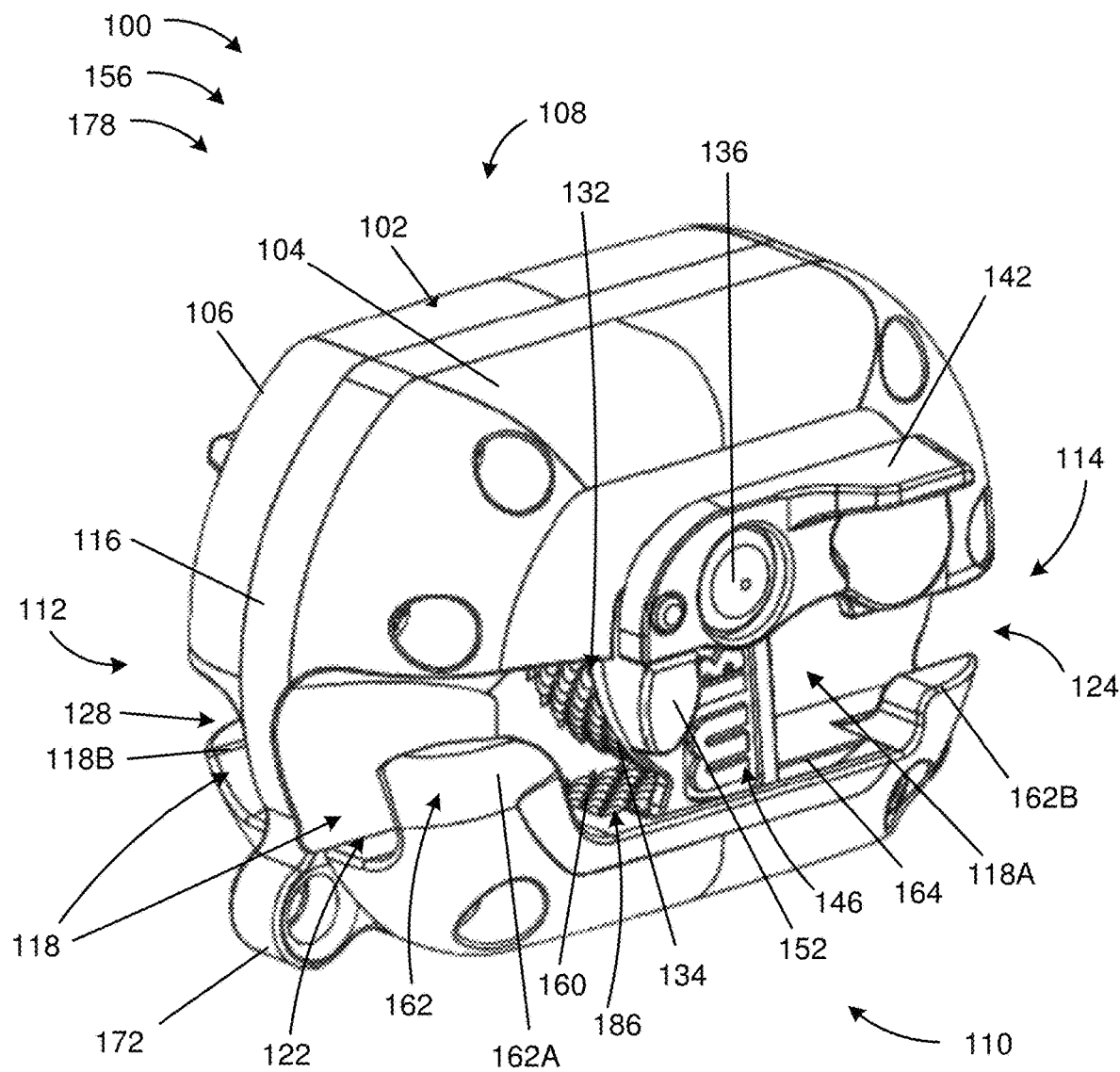
FIG. 1A is a perspective view of a cord coupling system in accordance with one example embodiment of the disclosure.
Figure 1B:
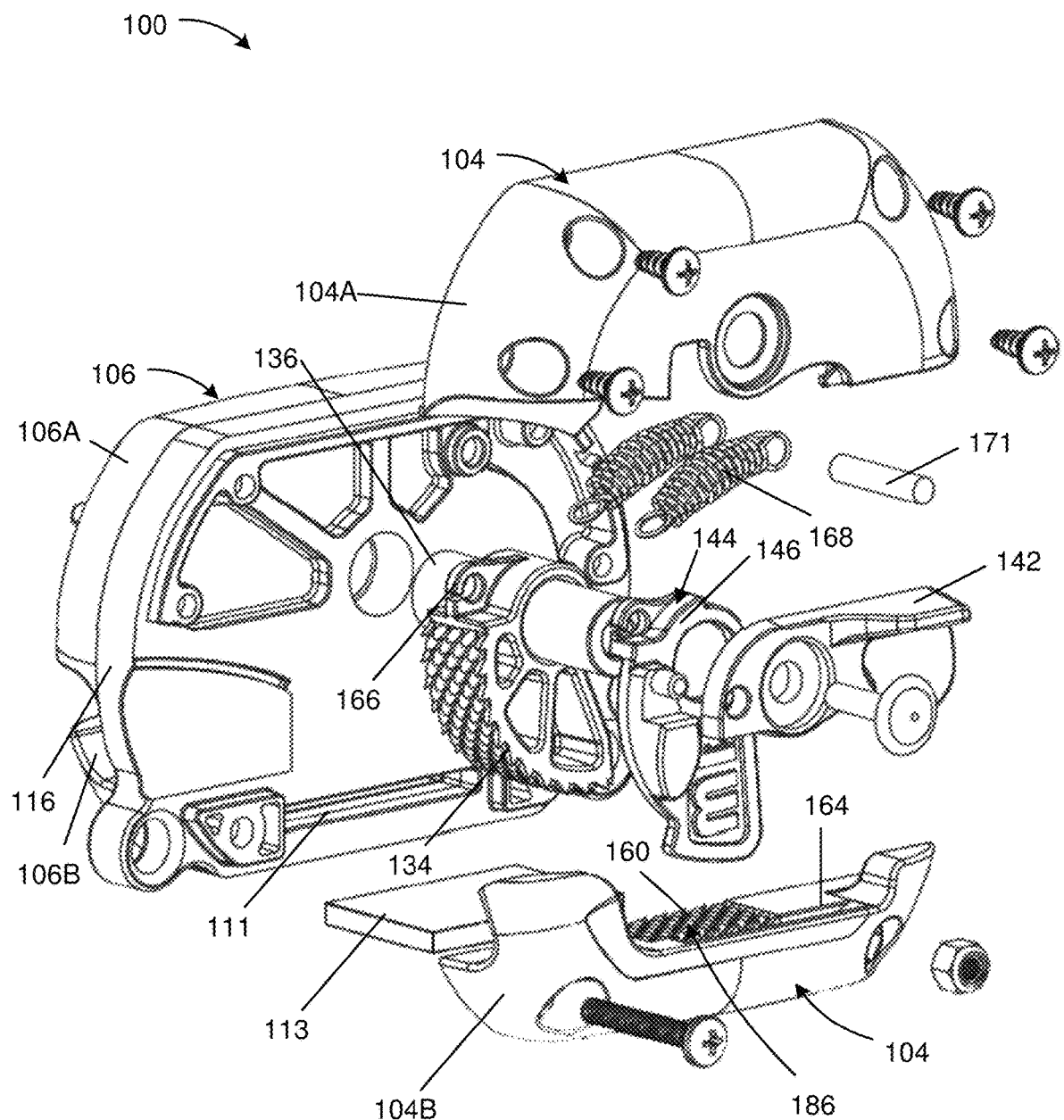
FIG. 1B is a partial-exploded view of the cord coupling system of FIG. 1A in accordance with one example embodiment of the disclosure.
Figure 1C:
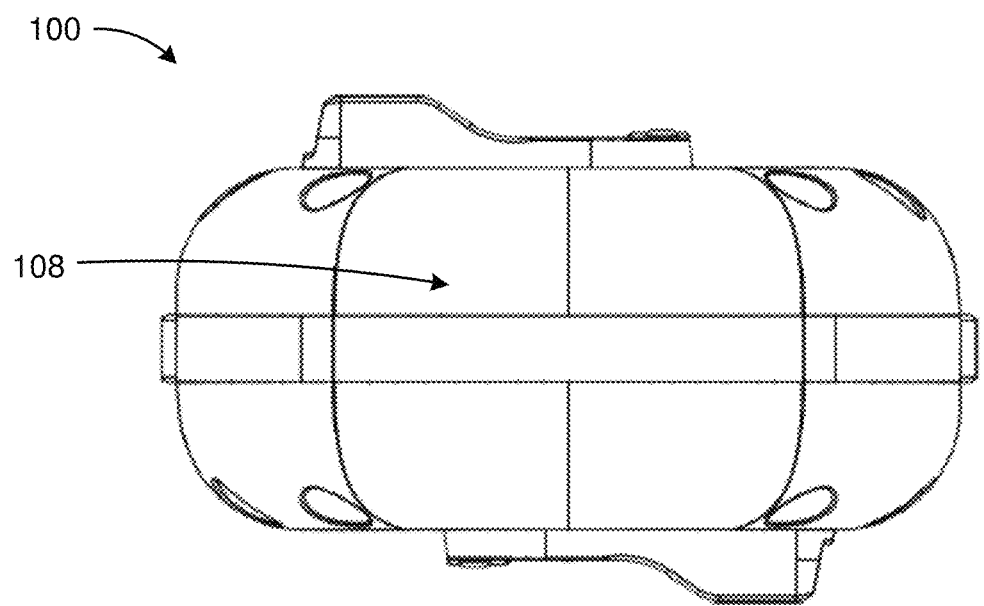
FIG. 1C is a top plan view of the cord coupling system of FIG. 1A in accordance with one example embodiment of the disclosure.
Figure 1D:
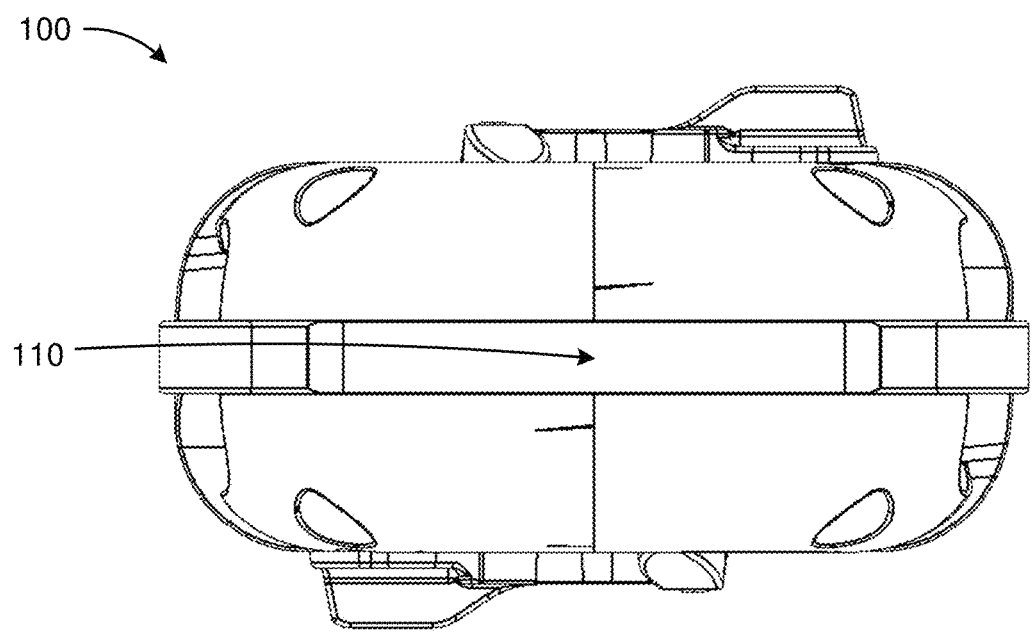
FIG. 1D is a bottom plan view of the cord coupling system of FIG. 1A in accordance with one example embodiment of the disclosure.

FIGS. 1A-1E depict various perspective views of a cord coupling system 100. The cord coupling system 100 can include a housing 102 with a first portion 104 and a second portion 106. In one example, the first portion 104 and the second portion 106 of the housing 102 can fasten together directly or indirectly to define one or more interior cavities within the housing. In certain example embodiments, the first portion 104 can include first top portion 104A and a first bottom portion 104B that are fastened, directly or indirectly, to the second portion 106. The first portion 104 and the second portion 106 can be split into multiple portions. In other examples, the first portion and the second portion may be one piece. Similarly, the second portion 106 can include a second top portion 106A and a second bottom portion 106B that are fastened, directly or indirectly, to the first portion 104. In one example, the housing 102 also includes a partition 116. In this example, the first portion 104 and the second portion 106 are indirectly fastened, with the first portion 104 (e.g., the first top portion 104A and the first bottom portion 104B) fastened to a first side of a partition 116 and the second portion 106 (e.g., the second top portion 106A and the second bottom portion 106B) fastened to an opposing side of the partition 116. In other embodiments, the first portion, the second portion, and the partition may all be one piece. In one example, the housing 102 can include a top surface 108 (e.g., as shown in FIG. 1C), an opposed bottom surface 110 (e.g., as shown in FIG. 1D), a front surface 112, and a rear surface 114. In other examples, the housing can be substantially spherical, cubic, or another shape. The housing 102 can be constructed of any material including, but not limited to, plastics, polymers, metal, alloys, or any combination thereof. The components described herein can be disposed on, alongside, or within the housing 102.

Figure 1E:
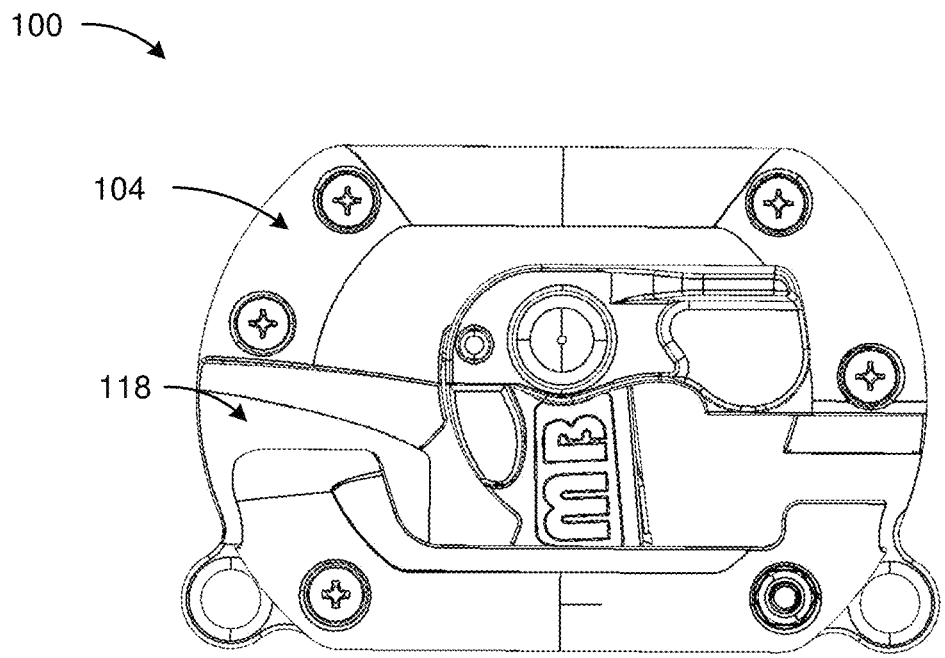
FIG. 1E is a first side elevation view of the cord coupling system of FIG. 1A in accordance with one example embodiment of the disclosure.
Figure 1F:
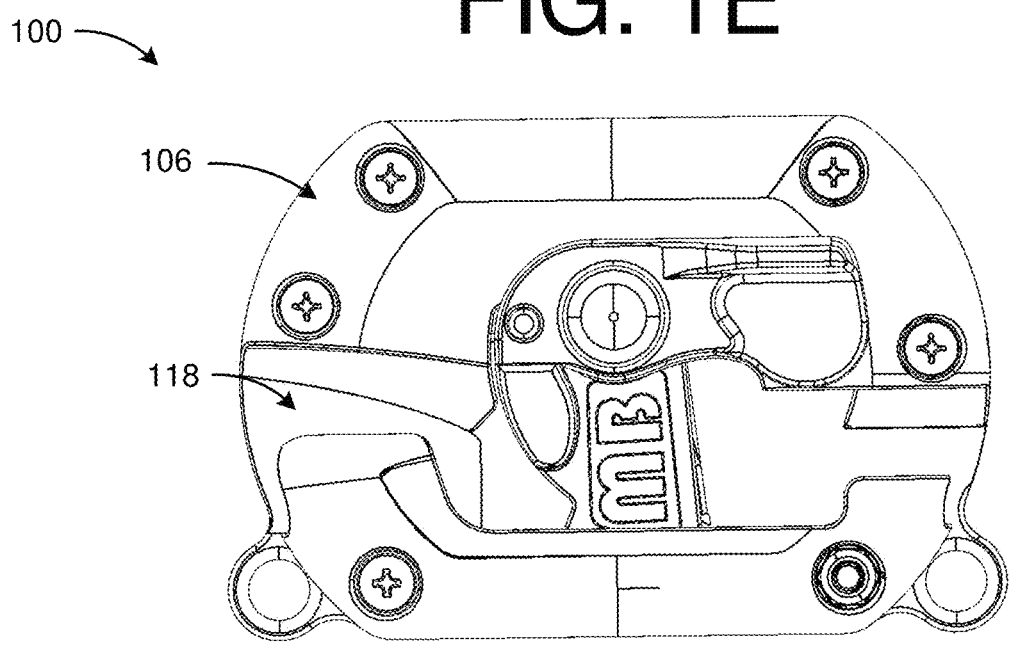
FIG. 1F is a second side elevation view of the cord coupling system of FIG. 1A in accordance with one example embodiment of the disclosure.
Figure 1G:
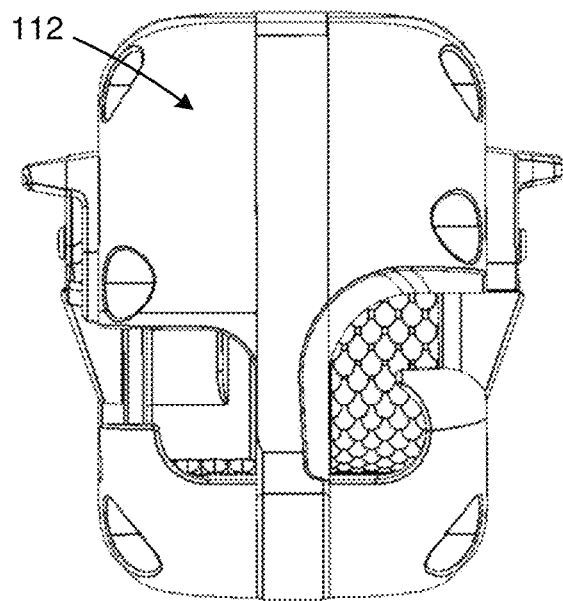
FIG. 1G is a front elevation view of the cord coupling system of FIG. 1A in accordance with one example embodiment of the disclosure.
Figure 1H:
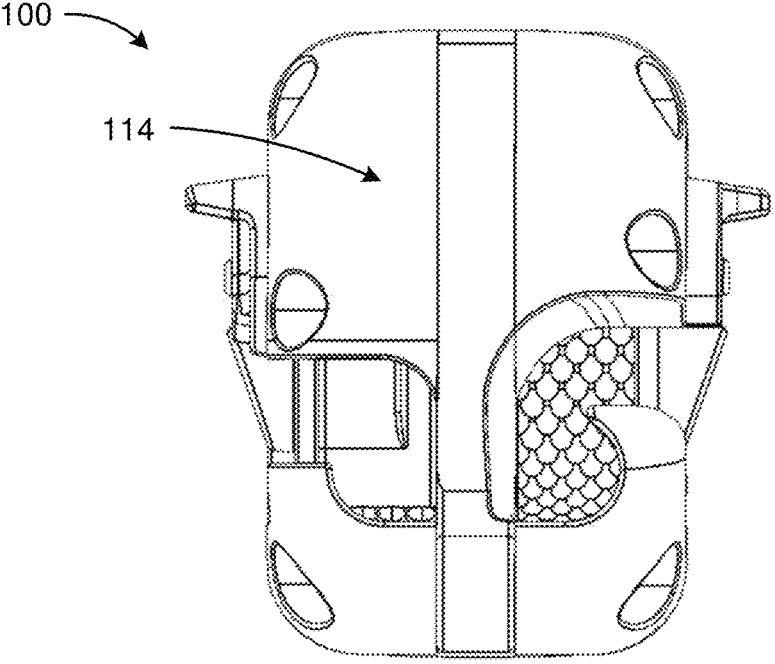
FIG. 1H is a rear elevation view of the cord coupling system of FIG. 1A in accordance with one example embodiment of the disclosure.

The first portion 104 and the partition 116 and the second portion 106 and the partition 116 can define a set of channels 118 (e.g., as shown in FIGS. 1E and 1F) extending along the first portion 104 and the second portion 106 of the housing 102. In one example, the set of channels 118 can extend from the front surface 112 to the rear surface 114. The set of channels 118 can be disposed on opposing sides of the partition 116. For example, a first channel 118A can be defined by or formed in the first portion 104 of the housing 102 and the partition 116. The first portion 104 of the housing 102 can form a set of walls (i.e., a first side 182 and a second side 184 formed by the first top portion 104A and the first bottom portion 104B) that extend away from the partition 116, generally creating a substantially rectangular cross-section. In other examples, the first portion 104 can form other cross-sectional shapes with the partition 116 (e.g., circular, triangular). The first channel 118A is configured to receive a cord therethrough. The set of channels 118 can include a second channel 118B. The second channel 118B can be formed by the second portion 106 of the housing 102 and the partition 116. The second portion 106 of the housing 102 can form a set of parallel walls that extend away from the partition 116, generally creating a substantially rectangular cross-section. In other examples, the second portion 106 of the housing can form other cross-sectional shapes with the partition 116 (e.g., circular, triangular). It should be appreciated that the set of channels 118 could be formed to orient in many different ways, such as the first channel 118A and the second channel 118B may be perpendicular or orient from the top surface 108 to the bottom surface 110.

Figure 2A:
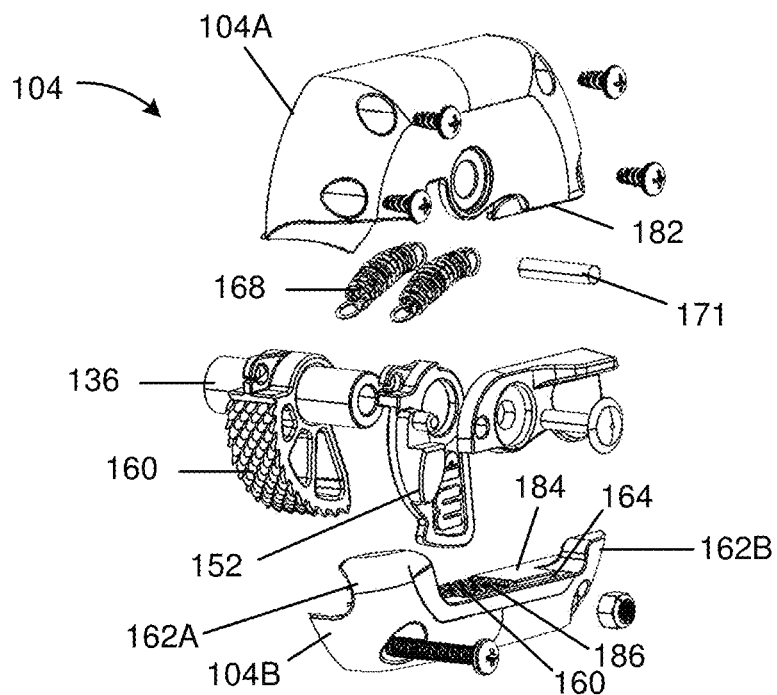
FIG. 2A is an exploded view of a first portion of a housing of the cord coupling system of FIG. 1A in accordance with one example embodiment of the disclosure.
Figure 2B:
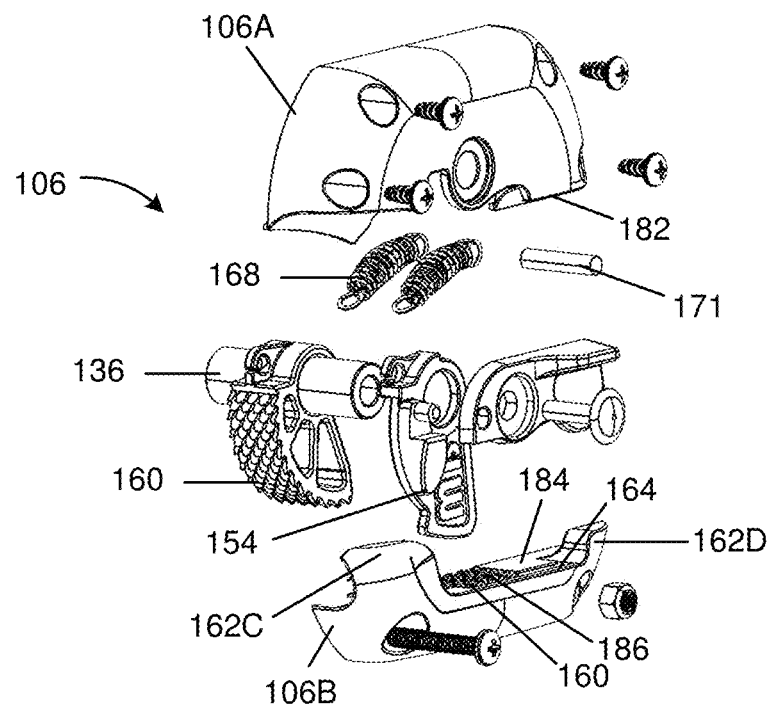
FIG. 2B is an exploded view of a second portion of the housing of the cord coupling system of FIG. 1A in accordance with one example embodiment of the disclosure.

The first portion 104 and the second portion 106 of the housing 102 can include at least one post 162 configured to guide a cord through the respective channel. Each portion 104/106 of the housing 102 can include at least one post 162A/162B/162C/162D at the front surface 112 and at least one post 162A/162B/162C/162D at the rear surface 114. The first channel posts 162A/162B can be disposed at the first channel front end 122 (e.g., as shown in FIG. 1A) and the first channel rear end 124. The second channel posts 162C/162D can be disposed at the second channel front end 128 and the second channel rear end 130 (e.g., as shown in FIG. 6C). Each post 162A/162B/162C/162D can partially extend parallel to the partition 116. For example, as shown in FIGS. 1A, 2A, and 2B, the first channel post 162A disposed at the first channel front end 122 and the second channel post 162C disposed at the second channel rear end 130 can extend from the second portion 104B/106B towards the first top portion 104A/106A, parallel to the partition 116. The post 162B disposed at the first channel rear end 124 and the second channel post 162D disposed at the second channel front end 128 can extend from the second portion 104B/106B towards the first top portion 104A/106A, parallel to the partition 116.

The set of channels 118A/118B includes a pair of rotatable jaws 132 configured to rotate within the cord coupling system. In one example, the pair of rotatable jaws 132 includes a first jaw 134 partially disposed within the first channel 118A and a second jaw 138 partially disposed within the second channel 118B. Each of the rotatable jaws 132 can include an arcuate textured outer surface configured to work in tandem with a gripped surface 186 (e.g., as shown in FIGS. 2A and 2B) disposed on a surface opposing the jaw within its respective channel. The pair of rotatable jaws 132 pivot about a shaft 136 secured within the housing 102. For example, a jaw shaft 136 can be disposed through the housing 102 and the rotatable jaws 132 are attached to the shaft 136. In some examples, the jaw shaft 136 can be a rivet. In other examples, the jaw shaft 136 may be a bolt, pin, or some other shaft mechanism.

The set of channels 118A/118B and the rotatable jaws 132 each include a set of teeth 160. In some examples, the set of channels 118A/118B include a gripped surface 186. The gripped surface can include a set of teeth 160. The set of teeth 160 are a series of angled scalar, oval-shaped teeth. The teeth can extend from the rotatable jaw and include a radial surface (e.g., not pointed). In other examples, the set of teeth may be pyramidal shapes (e.g., with a point) configured to anchor within a cord set within the set of channels 118. The teeth 160 can grip cords resting against the teeth so that the cord cannot move in a single direction. The cord may be able to move in the opposite direction. For example, the teeth 160 can be angled towards the rear end of each channel. The cord then may not move against the teeth towards the front end of the each channel, but the cord may move towards the rear end of each channel. Conversely, the teeth may be angled towards the front end of each channel. The cord then may not move against the teeth towards the rear end of each channel, but the cord may move towards the front end of each channel. The teeth 160 in each channel and disposed on the rotatable jaws may all be angled towards the front surface 112. The teeth 160 in each channel and disposed on the rotatable jaws may be angled towards the rear surface 114. The teeth 160 in each channel and disposed on the rotatable jaws may be angled in opposing directions in their respective channels (e.g., the first channel teeth angled towards the rear surface, and the second channel teeth angled towards the front surface).

In one example, the pair of rotatable jaws 132 include a hook 166 disposed on an end of each jaw. The hook 166 anchors a spring 168 attached thereto. The spring 168 extends between the hook 166 and attaches to a catch pin 171 (e.g., as shown in FIG. 1B) anchored within the inner surface 176 of the housing. In some embodiments, the spring 168 is an extension spring thereby creating a force on the rotatable jaw 132 to rotate to the first jaw position 156. In the first jaw position 156, the set of teeth 160 disposed between the rotatable jaws 132 and the set of channels 118 grips a cord disposed therein.

Figure 6A:
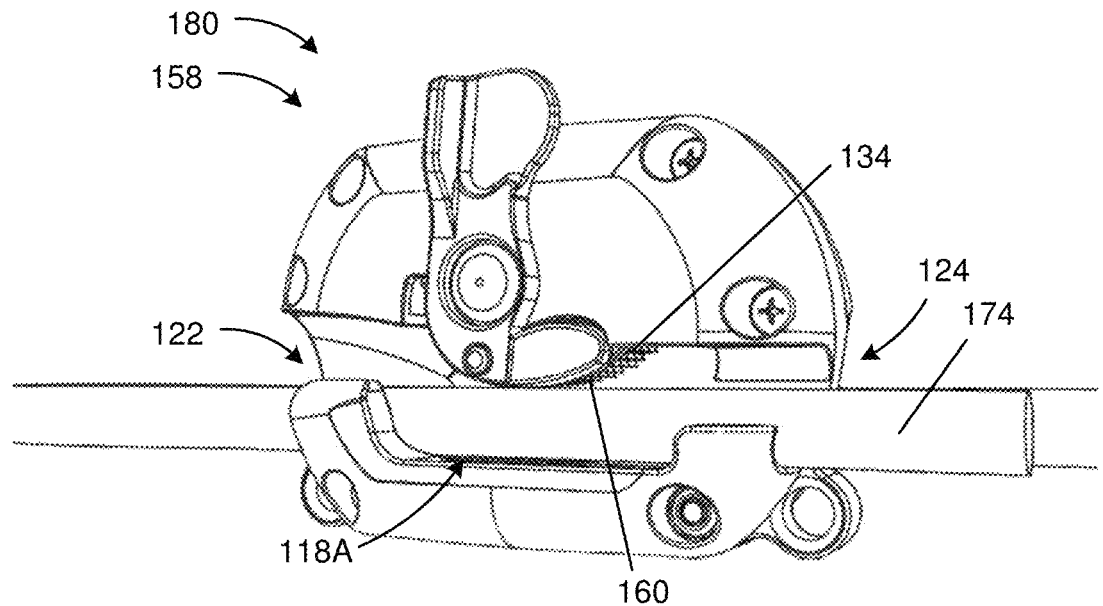
FIG. 6A is a perspective view of the first portion of the cord coupling system of FIG. 1A in a second jaw position in accordance with one example embodiment of the disclosure.
Figure 6B:
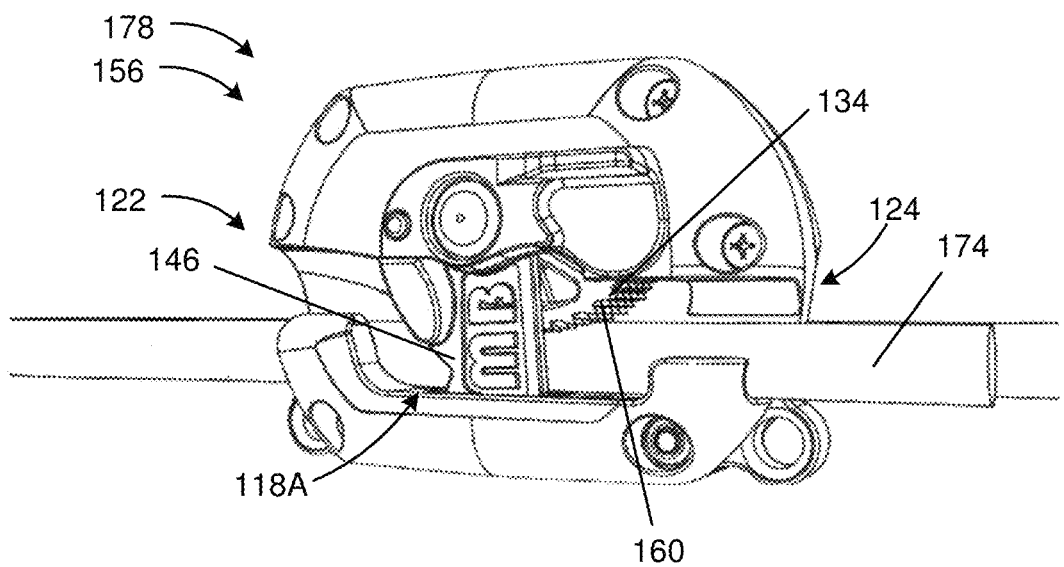
FIG. 6B is a perspective view of the first portion of the cord coupling system of FIG. 1A in a first jaw position in accordance with one example embodiment of the disclosure.
Figure 6C:
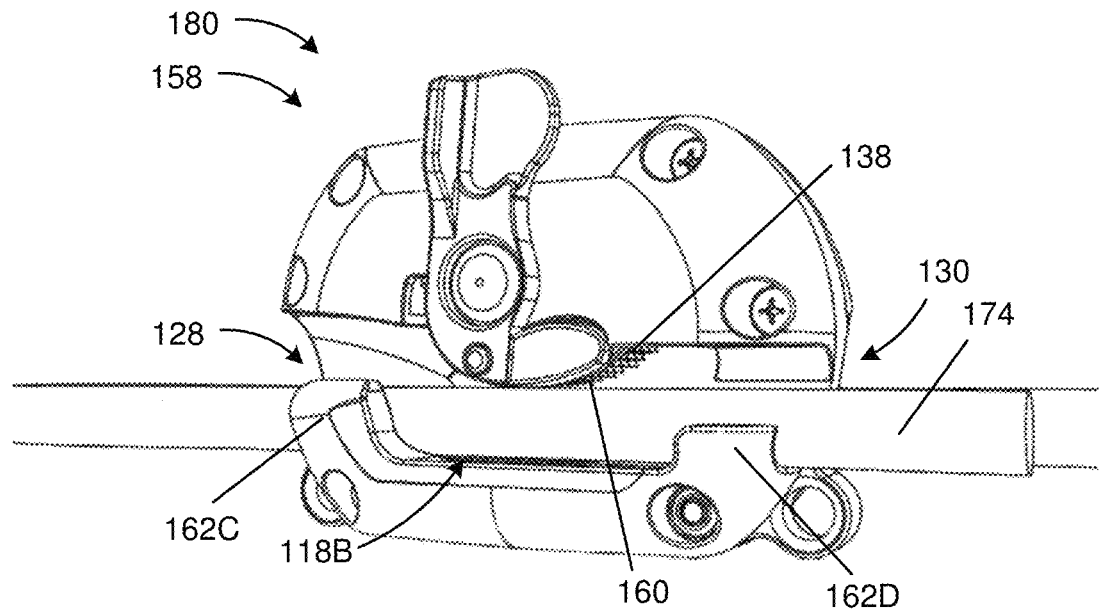
FIG. 6C is a perspective view of the second portion of the cord coupling system of FIG. 1A in a second jaw position in accordance with one example embodiment of the disclosure.

The shaft can secure a jaw tab 142 configured to move the jaws between a first jaw position 156 and a second jaw position 158 (e.g., as shown in FIGS. 6A and 6B). For example, in the first jaw position 156, the jaws are partially disposed within the respective channel. The jaw tab 142 can rotate to simultaneously rotate the abutting jaw to the second jaw position 158 within the housing 102. The jaw tab adjacent to the first jaw 134 can rotate the first jaw 134 separately from the jaw tab adjacent to the second jaw 138. The jaw tab adjacent to the second jaw 138 can rotate the second jaw 138 separate from the jaw tab adjacent to the first jaw 134. In some examples as described herein, the jaw tab can simultaneously rotate gates disposed adjacent to the rotatable jaws. In some examples, when the cord 174 is disposed within one of the channels, the rotatable jaw can abut the cord between the first jaw position and the second jaw position and the gate can rotate back to a resting first gate position. In this manner, the jaw secures the cord from moving in at least one direction along the channel and the gate secures the cord from moving in a perpendicular direction from within the channel.

In certain example embodiments, at least one rotatable jaw 132 can rotate into the second jaw position 158 via the jaw tab 142. The respective channel (e.g., first channel 118A, second channel 118B) is open to receive a cord. In one example, the first jaw 134 can rotate to a second jaw position 158 in the first channel 118A. A cord 174 can be inserted into the channel via the first channel front end 122 or the first channel rear end 124. In some examples, the first channel set of teeth 160 are angled towards the first channel rear end 124, and the cord 174, therefore, has less resistance traveling between the first channel front end 122 to the first channel rear end 124. In other examples, the set of teeth 160 may extend perpendicularly (e.g., 90 degrees) to the relative surface (e.g., the channel or the jaw) or at another various angle. As the cord 174 is inserted into the first channel 118A, the post 162A/162B may guide and secure the rope within the first channel 118A. The cord 174 can be set within the first channel 118A contacting the set of teeth 160 disposed on the first jaw 134 and on the first channel 118A. The teeth angled towards the first channel rear end 124 are configured to allow cord 174 to continuously slide toward the first channel rear end 124. Conversely, the cord 174 set against the first jaw 134 in the first jaw position 156 is prevented from sliding back toward the first channel front end 122 as the teeth dig deeper into the cord 174 as the cord 174 slides.

In certain example embodiments, the second jaw 138 can rotate to a second jaw position 158 in the second channel 118B. A cord 174 can be inserted into the channel via the second channel front end 128 or the second channel rear end 130. In some examples, the second channel 118B set of teeth 160 are angled towards the second channel front end 128, opposite the set of teeth 160 disposed in the first channel 118A, and the cord 174, therefore, has less resistance traveling between the second channel rear end 130 to the second channel front end 128. In other examples, the set of teeth 160 may extend perpendicularly (e.g., 90 degrees) to the relative surface (e.g., the channel or the jaw) or at another various angle. As the cord 174 is inserted into the second channel 118B, the post 162C/162D may guide and secure the cord within the second channel 118B. One benefit to the cord being set within both channels is to create a fixed bight or loop with the cord. The cord 174 can be set within the second channel 118B contacting the set of teeth 160 disposed on the second jaw 138 and on the second channel 118B. The teeth angled towards the second channel front end 128 are configured to allow cord 174 to continuously slide toward the second channel front end 128. Conversely, the cord 174 set against the second jaw 138 in the first jaw position 156 is prevented from sliding back toward the second channel rear end 130 as the teeth dig deeper into the cord 174 as the cord 174 slides.

In certain example embodiments, the cord coupling system 100 includes a pair of gates 144 configured to rotate about the jaw shaft 136 between a first gate position 178 and a second gate position 180. In one example, the pair of gates 144 includes a first gate 146 and a second gate 148 disposed adjacent to the first jaw 134 and the second jaw 138, respectively. The pair of gates 144 can be a planar surface fixed about the jaw shaft 136. Each gate can be received by a groove within a set of grooves 164 disposed on the housing 102 as the gate rotates between the first gate position 178 and the second gate position 180. For example, the set of grooves 164 can include an arcuate inner surface to accommodate the planar shape of the gate 144. In the first gate position 178, the pair of gates 144 rest against one side of the groove 164. In some embodiments, the first gate position 178 keeps any cord inserted within the respective channel from sliding laterally outside the channel in tandem with the posts. As the gate rotates to an unlocked gate position, the gate glides along the inner surfaces of the groove 164 and exits the groove 164 entirely in the unlocked gate position.

In certain example embodiments, the pair of gates 144 can rotate independently from the pair of rotatable jaws 132 via one or more gate tabs (e.g., a first gate tab 152, a second gate tab 154). For example, the first gate 146 and the first jaw 134 can rest in the first position (e.g., a first gate position, a first jaw position described herein). The first gate tab 152 can move to rotate the first gate 146 to the unlocked gate position, thereby leaving the first jaw 134 still in the first position. The first gate 146 can move with the first jaw 134 as the first jaw 134 rotates to the second position, via the jaw tab 142 engaging the first gate 146 tab. Similarly, the second gate tab 154 can move to rotate the second gate 148 to the unlocked gate position, thereby leaving the second jaw 138 still in the first position. The second gate 148 can move with the second jaw 138 as the second jaw 138 rotates to the second position, via the jaw tab 142 engaging the second gate tab 154.

In certain example embodiments, the cord coupling system 100 includes at least one anchor 172. In one example, the anchor 172 can receive a handle, a carabineer, a strap, or other mechanism.

FIG. 1B depicts an exploded view of the cord coupling system 100. The housing 102 can include a slot 111 that extends from the first portion 104, through the partition 116, to the second portion 106. The slot 111 can secure a brace 113 therein. Beneficially, the brace 113 may provide extra strength to the housing.

FIGS. 2A and 2B depict exploded views of the first portion 104 of the housing 102 and the second portion 106 of the housing 102, respectively. Each portion 104/106 of the housing 102 can include a first top portion 104A/106A and a second bottom portion 104B/106B that fasten to the partition 116 (e.g., as shown in FIG. 1A). The first top portion 104A/106A of each half is configured to house the spring(s) 168 and the jaw shaft 136 discussed herein. The first top portion 104A/106A of the housing 102 can form a first side 182 of the channels 118 (e.g. as shown in FIG. 1A). The second bottom portion 104B/106B of the housing 102 can form a second side 184 of the channel 118. In one example, the second side 184 of the channel 118 on the second portion 106 can include a gripped surface 186. The gripped surface 186 can include a set of teeth 160. In other examples, the gripped surface 186 can include a knurled or other type of frictional surface. The second portion 104B/106B can include a groove 164 configured to receive the gate(s) 144.

Figure 3A:
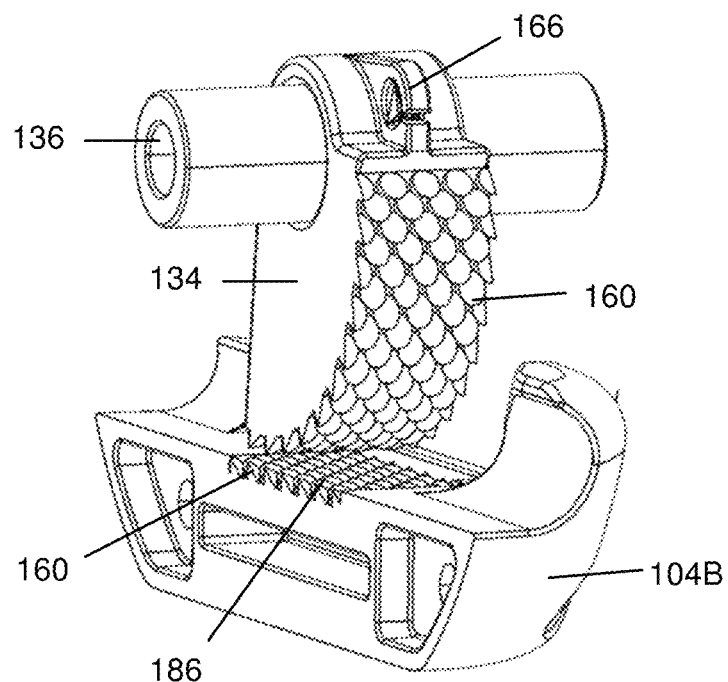
FIG. 3A is a front perspective view of a rotatable toothed jaw in the cord coupling system of FIG. 1A in accordance with one example embodiment of the disclosure.
Figure 3B:
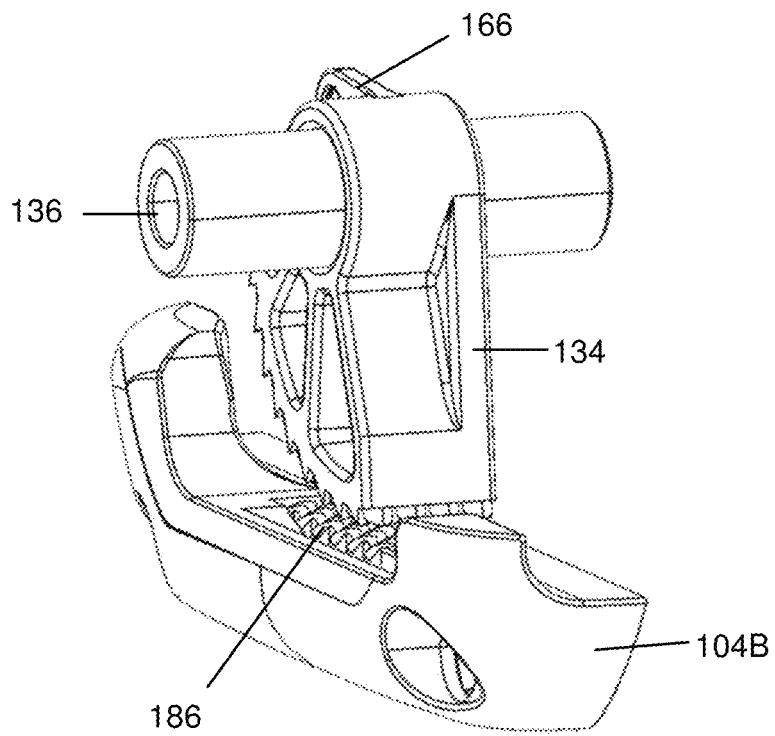
FIG. 3B is a rear perspective view of the rotatable toothed jaw of FIG. 3A in accordance with one example embodiment of the disclosure.

Referring to FIGS. 3A and 3B, each of the pair of rotatable jaws 132 attach to a jaw shaft 136 configured to anchor the jaw within the housing 102 (e.g., as shown in FIG. 1A). The rotatable jaws can pivot about the shaft. In one example, the jaw shaft is cylindrical and extends through a channel on the jaw. As shown, the first jaw 134 includes a set of teeth 160 disposed on the arcuate surface of the first jaw 134. At one end of the first jaw 134, a hook 166 configured to anchor a spring (not shown) by which the first jaw 134 is forced to rotate between the second position to the first position. FIGS. 3A and 3B show a first bottom portion 104B of the first portion of the housing. The portion of the first half of the housing 104 as shown forms a textured exterior wall of the first channel 118A. In one example, the gripped surface 186 includes a set of teeth 160. The set of teeth 160 along the first jaw 134 angle the same direction as the set of teeth 160 disposed along the first channel 118A.

Figure 4:
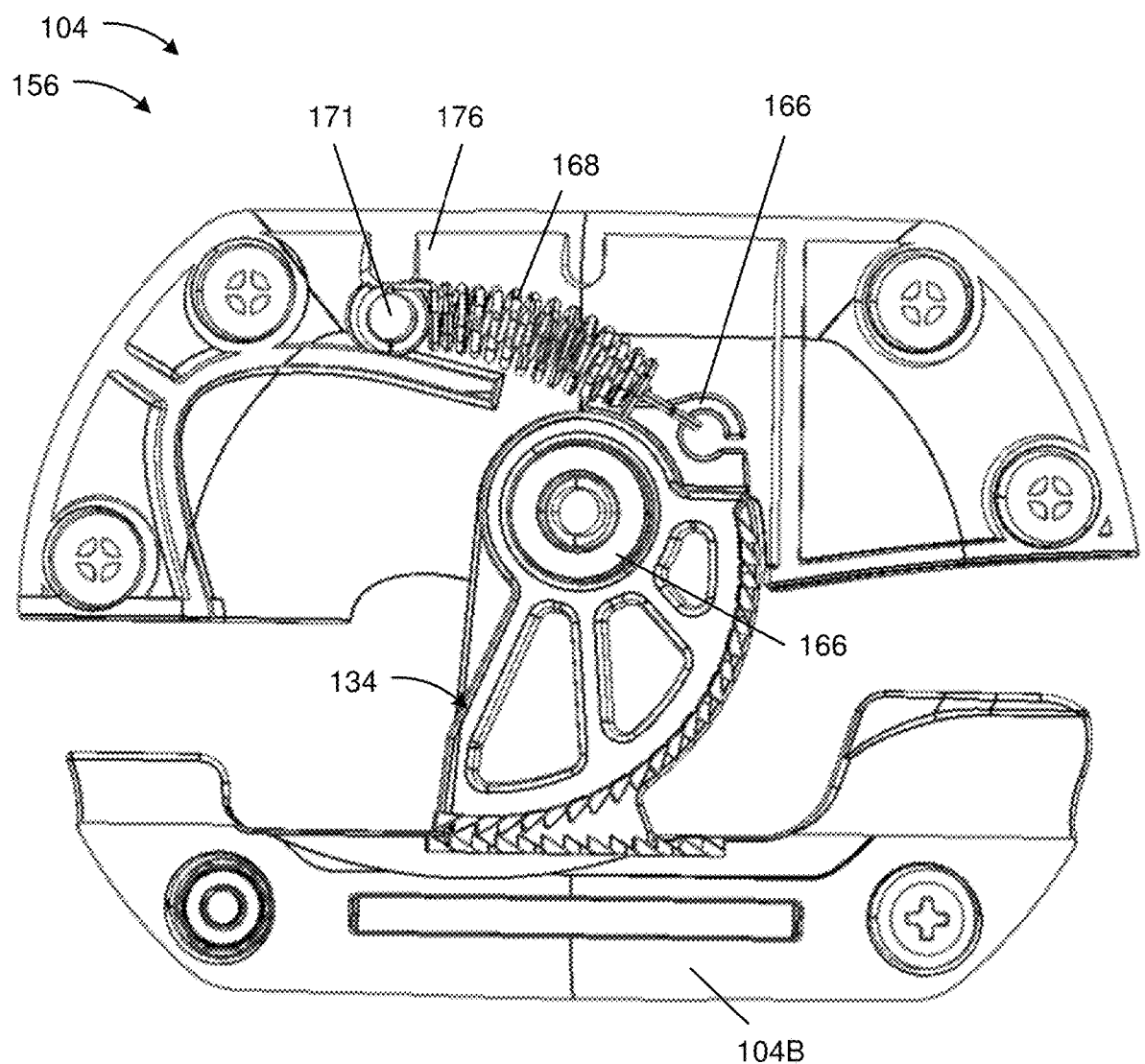
FIG. 4 is a cross-sectional view of the cord coupling system of FIG. 1A in accordance with one example embodiment of the disclosure.

FIG. 4 depicts a cross-sectional view of the cord coupling system 100. Specifically, the first portion 104 of the housing 102 and the components therein are shown in a first jaw position 156. The first jaw 134 is secured onto the jaw shaft 136 within the first portion 104 of the housing 102. The first jaw 134 includes a hook 166 disposed on one end of the first jaw 134. The hook 166 can receive a biasing mechanism such as the spring 168. The spring 168 may extend and attach onto the inner surface 176 of the housing 102. The spring 168 can be an extension spring configured to rotate the first jaw 134 back to the first jaw position 156.

Figure 5A:
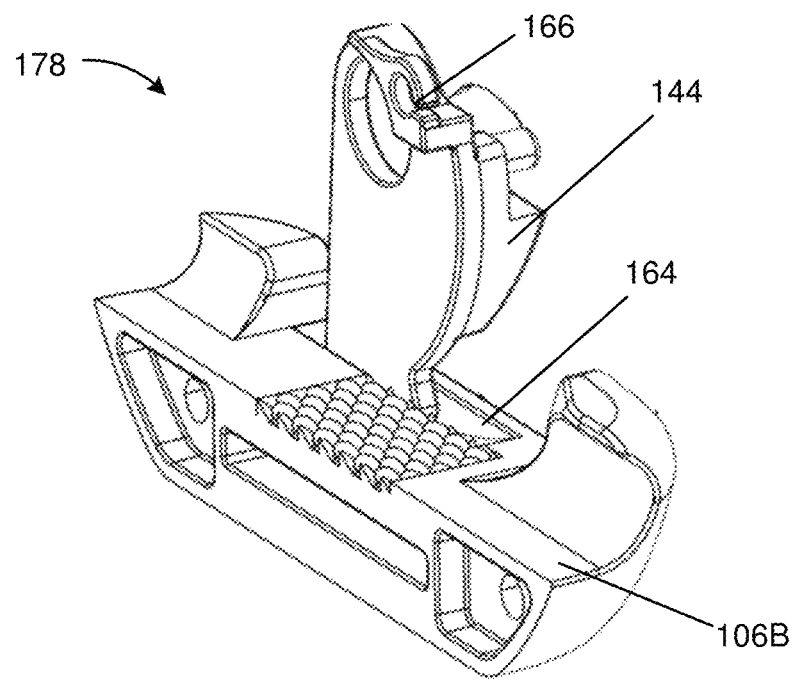
FIG. 5A is a partial-perspective view of a gate of the cord coupling system of FIG. 1A in accordance with one example embodiment of the disclosure.
Figure 5B:
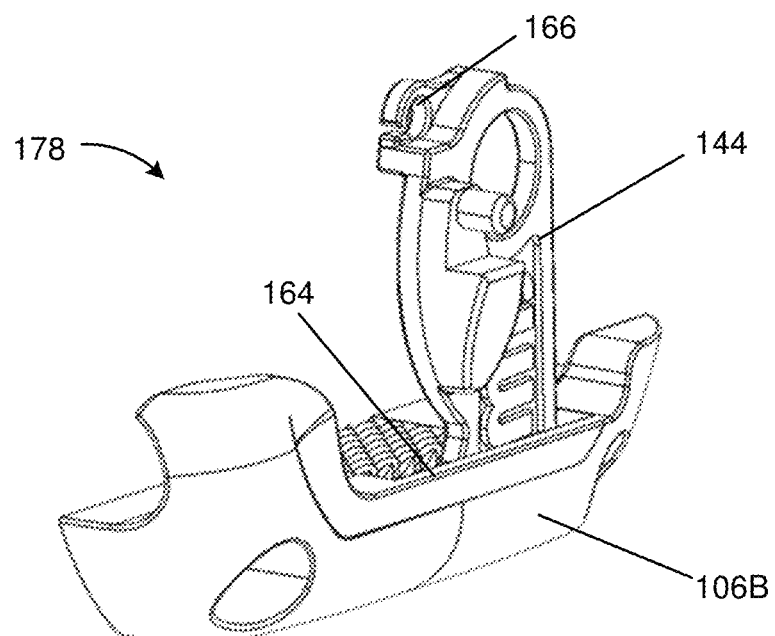
FIG. 5B is a second partial-perspective view of the gate of the cord coupling system of FIG. 1A in accordance with one example embodiment of the disclosure.

FIGS. 5A and 5B depict the second bottom portion 106B of the second portion 106 of the housing 102 engaged with the pair of gates 144. In one example, the second bottom portion 106B includes a groove 164 configured to receive the gate 144 in the first gate position 178. The pair of gates 144 include a hook 166 configured to receive a biasing mechanism, such as a spring 168 (e.g., as shown in FIG. 4). For example, the spring can latch onto the hook 166 and extend to the pin 171 disposed within the housing. The spring can be an extension spring configured to rotate the gate to the first gate position 178.

FIGS. 6A-8 depict various views of the cord coupling system 100. The first jaw 134 and the first gate 146 can rotate between the second jaw position 158 and the second gate position 180 to the first jaw position 156 and the first gate position 178, respectively. As shown in FIGS. 6A and 6B, the cord 174 is placed in the first channel 118A to secure within the channel. For example, FIG. 6A depicts the first jaw 134 rotated to the second jaw position 158. The cord 174 is not gripped by the first jaw 134 in the second jaw position 158, and the cord 174 can freely move towards the first channel front end 122 or the first channel rear end 124. FIG. 6B depicts the first jaw 134 rotated to the first jaw position 156. In the first jaw position 156, the cord 174 meets strong resistance from the set of teeth 160 when pulled towards the first channel front end 122. In some embodiments, when the set of teeth 160 are angled towards the first channel rear end 124, the cord 174 may slide towards the first channel rear end 124.

Figure 6D:
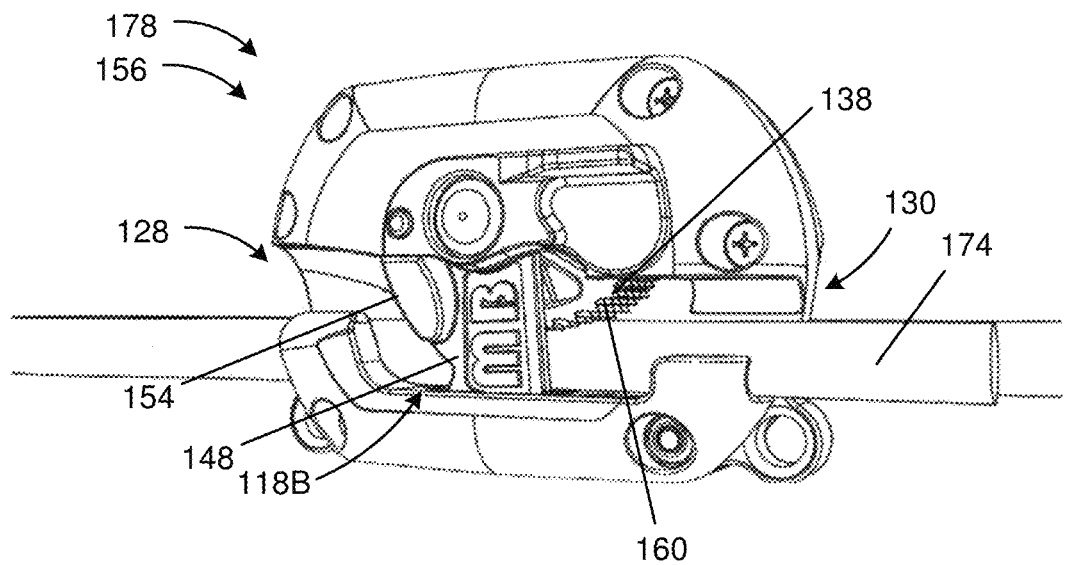
FIG. 6D is a perspective view of the second portion of the cord coupling system of FIG. 1A in a first jaw position in accordance with one example embodiment of the disclosure.

The second jaw 138 and the second gate 148 can rotate between the second jaw position 158 and the second gate position 180 to the first jaw position 156 and the first gate position 178, respectively. As shown in FIG. 6C, the cord 174 is placed in the second channel 118B to secure within the channel. For example, FIG. 6C depicts the second jaw 138 rotated to the second jaw position 158. The cord 174 is not gripped by the second jaw 138 in the second jaw position 158, and the cord 174 can freely move towards the second channel front end 128 or the second channel rear end 130. FIG. 6D depicts the second jaw 138 rotated to the first jaw position 156. In the first jaw position 156, the cord 174 meets strong resistance from the set of teeth 160 when pulled towards the second channel rear end 130. In some embodiments, when the set of teeth 160 are angled towards the second channel front end 128, the cord 174 may operable slide towards the second channel front end 128.

Figure 7:
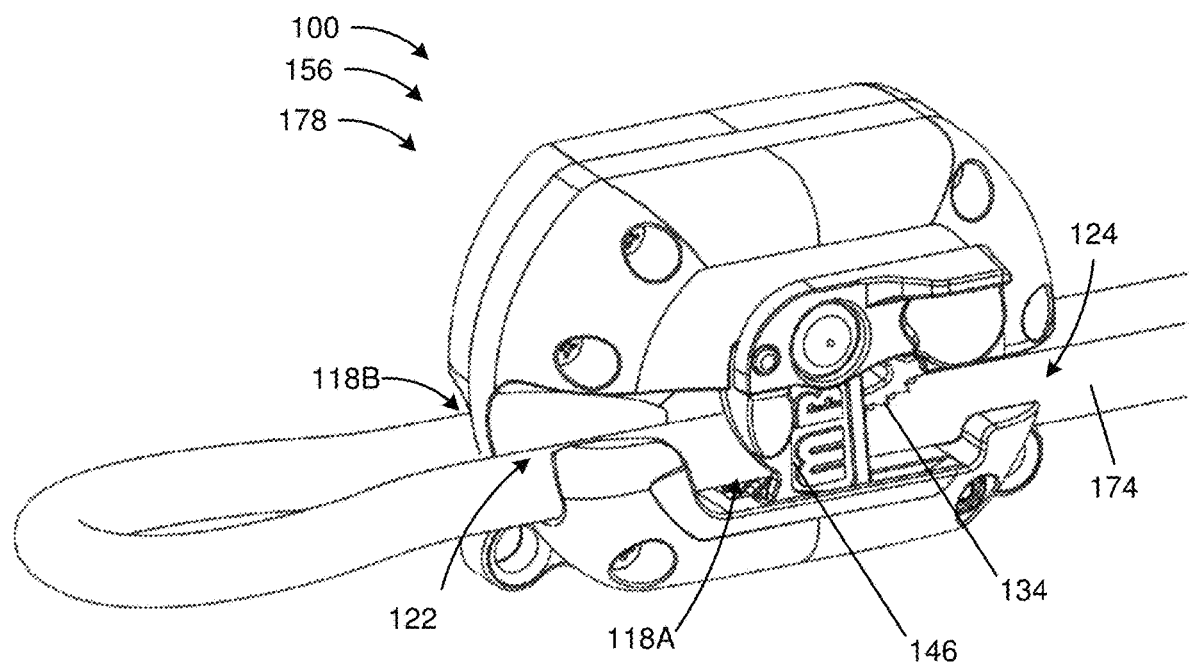
FIG. 7 is a perspective view of the cord coupling system of FIG. 1A, showing a first jaw engaged in a first jaw position with a cord in accordance with one example embodiment of the disclosure.
Figure 8:
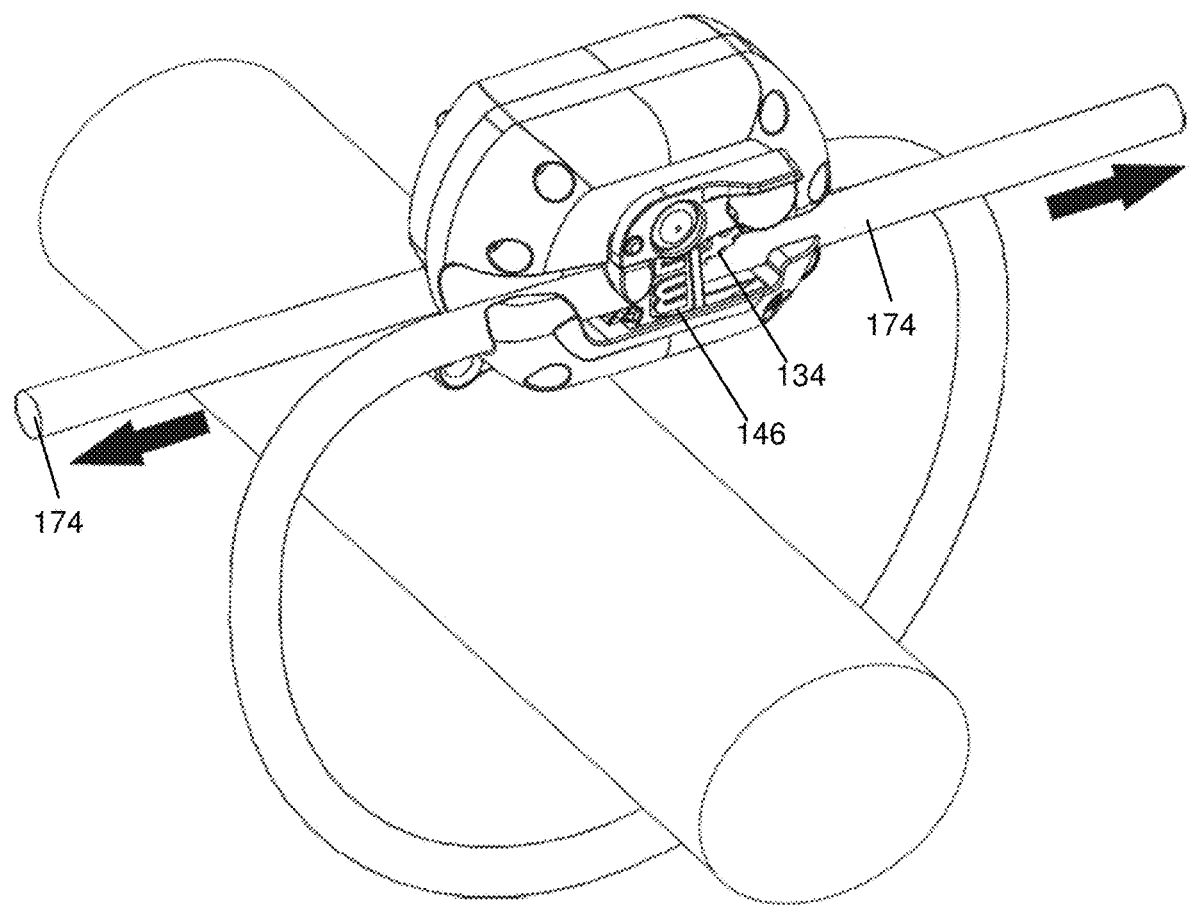
FIG. 8 is a perspective view of the cord coupling system of FIG. 1A, showing a first jaw engaged in the first jaw position with a cord on the first side and the second jaw engaged in the first jaw position with the cord on the second side in accordance with one example embodiment of the disclosure.

FIGS. 7 and 8 depict the cord coupling system 100 securing the rope to form a bight and a loop, respectively. For example, the channels 118 each secure the cord 174 in the first jaw position 156 and the first gate position 178. As shown, the first jaw 134 and the first gate 146 are in the first jaw position 156 and the first gate position, respectively. The cord 174 may be able to slide towards the first channel rear end 124 but unable to slide towards the first channel front end 122. The second channel 118B gate and jaw (not shown) may be in the same position to anchor the cord 174.

Although the cord coupling system features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A cord coupling system comprising:
   a housing comprising a front surface and a rear surface;
   a set of channels disposed on the housing;
   a pair of rotatable jaws partially disposed within the set of channels, wherein the pair of rotatable jaws rotate between a first jaw position and a second jaw position;
   a set of teeth disposed on each rotatable jaw and within each channel; and
   a pair of gates adjacent to the pair of rotatable jaws, wherein the pair of gates rotate between a first gate position and a second gate position.

2. The cord coupling system of claim 1, wherein the set of teeth are oval-shaped.

3. The cord coupling system of claim 1, wherein the set of channels comprises:
   a first channel comprising a first channel front end and a first channel rear end; and
   a second channel comprising a second channel front end and a second channel rear end.

4. The cord coupling system of claim 3, wherein the set of teeth of the first channel angle toward the first channel rear end and the set of teeth of the second channel angle toward the second channel front end.

5. The cord coupling system of claim 3, wherein the set of channels comprises at least one post disposed towards the front end and towards the rear end of each channel.

6. The cord coupling system of claim 1, wherein the housing further comprises a set of grooves, wherein each groove receives the gate in the first gate position.

7. The cord coupling system of claim 1, wherein the pair of rotatable jaws comprises:
   a first jaw configured to rotate towards the front surface into the second jaw position; and
   a second jaw configured to rotate towards the rear surface into the second jaw position.

8. The cord coupling system of claim 1, wherein the pair of rotatable jaws and the pair of gates comprise a tab configured to pivot each between the first gate position and the second gate position.

9. The cord coupling system of claim 1, wherein the set of channels extend from the front surface to the rear surface.

10. The cord coupling system of claim 1, further comprising at least one anchor disposed on the housing.

11. The cord coupling system of claim 1, wherein the pair of rotatable jaws and the pair of gates comprises a hook disposed on each rotatable jaw and each gate.

12. The cord coupling system of claim 11, further comprising a spring secured between the housing and each hook.

13. The cord coupling system of claim 1, further comprising a partition disposed between the set of channels.

14. A cord coupling system, comprising:
   a housing comprising a first half, a second half, a top surface, an opposed bottom surface, a front surface, and a rear surface;
   a first channel disposed on the first half of the housing;
   a second channel disposed on the second half of the housing;
   a first jaw set within the first channel, the first jaw configured to rotate towards the front surface into a second jaw position;
   a second jaw set within the second channel, the second jaw configured to rotate towards the rear surface into the second jaw position; and
   a pair of gates adjacent to the first jaw and the second jaw, wherein the first jaw, the second jaw, and the pair of gates separately rotate between a first gate position and a second gate position.

15. The cord coupling system of claim 14, wherein the channels comprise at least one post disposed towards the front surface and towards the second end of each channel.

16. The cord coupling system of claim 14, wherein the first channel and the second channel extend from the front surface to the rear surface.

17. The cord coupling system of claim 14, further comprising at least one anchor.

18. A cord coupling system comprising:
   a housing comprising a first half, a second half, a top surface, an opposed bottom surface, a front surface, and a rear surface;
   a set of channels disposed on the housing;
   a pair of rotatable jaws adjacent to the set of channels;
   a pair of gates adjacent to the pair of rotatable jaws, wherein the pair of rotatable jaws and the pair of gates separately rotate between a first gate position and a second gate position;
   a plurality of springs coupled between the housing and the rotatable jaws and gates; and
   a set of teeth disposed on the pair of rotatable jaws and within the set of channels.

19. The cord coupling system of claim 18, wherein the set of channels comprises at least one post configured to secure a cord within the channel.

20. The cord coupling system of claim 18, wherein the set of channels extend from the front surface to the rear surface of the housing.

* * * * *